Feb. 19, 1963   R. M. GAYOL   3,078,145
PROCESS AND APPARATUS FOR PRODUCING ANHYDROUS ALUMINUM CHLORIDE
Filed Oct. 12, 1959
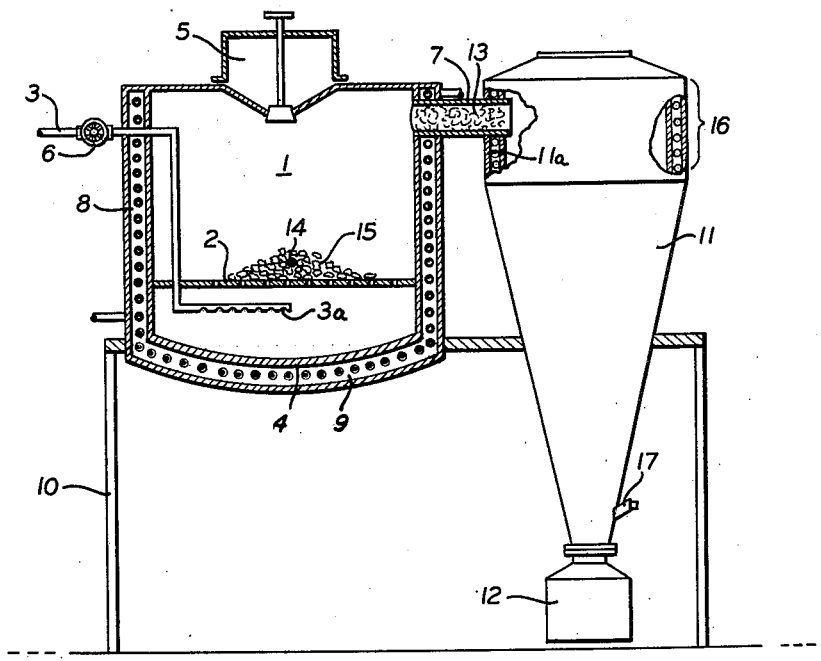
INVENTOR
Ramon Martinez Gayol
BY
ATTORNEY

United States Patent Office 3,078,145
Patented Feb. 19, 1963

3,078,145
PROCESS AND APPARATUS FOR PRODUCING ANHYDROUS ALUMINUM CHLORIDE
Roman Martinez Gayol, Madrid, Spain, assignor to Empresa Nacional Calvo Sotelo de Combustibles Liquidos Y Lubricantes, S.A., Madrid, Spain, a firm of Spain
Filed Oct. 12, 1959, Ser. No. 845,923
Claims priority, application Spain Oct. 14, 1958
6 Claims. (Cl. 23—93)

This invention relates to the production of anhydrous aluminum chloride and it has particular relation to a process and an apparatus for producing anhydrous $AlCl_3$ from metallic aluminum and gaseous chlorine.

It is known from the art that anhydrous aluminum chloride has some peculiar characteristics which render the manufacture of anhydrous aluminum chloride of satisfactory quality from metallic aluminum and chlorine difficult. At temperatures below 178° C. it exists in white hexagonal crystals. When the solid product is heated, it sublimes and passes to the gaseous state at 178° C. and upon being deposited on a surface and heated to 194° C., it melts. The molten product is capable of absorbing or dissolving $AlCl_3$ vapor and thus growing. These phenomena occur in known processes for manufacturing anhydrous $AlCl_3$ and cause considerable difficulties which are due to obstructions in the condensers and necessitate interruptions of the manufacturing process. Moreover, these difficulties result in the occurrence of impurities in the aluminum chloride and in the formation of a product of non-uniform particle size, so that it becomes necessary to grind or sublimate the product.

The reaction between metallic aluminum and chlorine gas starts in the range of 200°–500° C., depending on the purity of and the ingredients present in the starting materials. These high temperatures may cause undesired melting of the metallic starting material, particularly if the reaction is carried out in a metal bed of large volume. In the reaction between aluminum and chlorine, the use of solid aluminum is always more advantageous, because the solid metal has a larger contact surface, can be handled more easily and has a lower reaction temperature. High reaction temperatures may cause volatilization of impurities present in the starting material. At moderate temperatures, e.g. below 400° C., the sublimed aluminum chloride can be obtained with a high degree of purity in a continuous process, whereby the impurities remain at the bottom of the reaction furnace and can be removed without interruption of the continuous process.

It is the main object of the present invention to provide a continuous process and an apparatus for continuously producing anhydrous $AlCl_3$ of high purity and uniform particle size, in which the aluminum bed is maintained substantially in solid condition.

Other objects and the advantages of the invention will be apparent from the following specification and claims and the appended diagrammatical drawing, which specifically illustrates by way of example a best mode of carrying out the invention, to which the invention is not limited.

In order to carry out the formation of $AlCl_3$ at low temperatures, it is contemplated according to the present invention to remove by cooling heat evolved by the reaction between aluminum and chlorine and, above all, always maintain the aluminum bed substantially in solid condition. In order to attain this, the aluminum to be reacted is placed on a grid or perforated support arranged in a reaction chamber at a suitable predetermined distance above the bottom of said chamber and the chlorine gas is passed to the aluminum from below, through said grid or support. If, for any reason, the reaction temperature rises in the reaction chamber sufficiently for causing the formation of molten aluminum, the latter flows to the bottom of the reaction chamber, which may be formed as a crucible, and the chlorine entering the space below the grid or support will react with the molten aluminum in said space, so that the supply of chlorine to the bed of solid aluminum is prevented or essentially restricted and the temperature of the said aluminum bed will be thus automatically reduced.

Referring now to the appended drawing, the apparatus for carrying out this invention comprises a reaction chamber denoted 1 in the drawing. This chamber contains a perforated support or grid 2 at a suitable distance from bottom 4 of the chamber. The grid 2 serves as a support for the solid aluminum to be reacted and also for distributing the chlorine which is continuously supplied through tube 3, the discharge openings 3a of which are arranged on the lower surface of the tube so that the jet of chlorine gas is directed toward the bottom surface 4 which may be shaped as a crucible. The amount of aluminum placed on grid 2 is supplemented at suitable intervals from hopper 5 so that formation of $AlCl_3$ takes place continuously.

The reaction chamber 1 is provided with a channel 7 for the discharge of $AlCl_3$ vapors and said channel is filled in its whole length with aluminum in the form of slugs, strips, or the like 13 or with filling bodies of other materials which are good conductors of heat and have high specific heat. Said channel opens into a condensing chamber 11, which consists of metal and is cooled preferably with water. Said channel or conduit 7 passes through the wall 11a of the condensing chamber 11 and projects into the interior of chamber 11 up to a predetermined distance. The amount and dimensions of the filling bodies in channel 7 are selected in such a manner that the free channel section left by the filling bodies allows the $AlCl_3$ vapors to enter the chamber 11 with a velocity which is adequate for obtaining the desired effects described hereinafter. Cooling means may be provided at 16.

The condensation chamber 11 is connected at its lower end with one, or several, interchangeable containers for collecting the anhydrous $AlCl_3$, one of such containers being shown at 12.

The reaction chamber can be provided with suitable means for locally elevating in one or more zones the temperature of the solid aluminum pieces 15 placed on grid 2 in order to initiate the reaction between said aluminum and the chlorine gas ascending through grid 2. The chlorine gas is introduced into the reaction chamber 1 through tube 3, the end portion of which is provided with discharge openings 3a, through which the chlorine is discharged in the direction of bottom surface 4. The vertical walls of the reaction chamber, as well as its bottom can be provided with cooling means, which can be externally arranged as indicated at 8 and 9, respectively, in the drawing. The temperature in the reaction chamber is maintained as low as possible in order to avoid the presence of impurities in the $AlCl_3$ vapors.

In the process of the invention, anhydrous $AlCl_3$ vapor is formed in the reaction chamber, which is discharged through tube or channel 7 into a free space in the interior of a condensing chamber 11, in which no contact of the $AlCl_3$ with the walls, or any other object, takes place. In said space, from the $AlCl_3$ produced crystals of small and uniform size are obtained. Through channel or tube 7 the $AlCl_3$ vapors pass into the central or middle zone of the condensation chamber 11 and are there cooled. As already mentioned above, during passage through condensing chamber 11, the $AlCl_3$ does not come in contact with the walls of this chamber; it likewise does not come in contact with the outer surfaces of tube 7, parts of which project into the condensing chamber 11. Due to the absence of such contacts, the adherence of AlCl₃ on walls or surfaces as well as the formation of molten or hardened AlCl₃ thereon, is prevented. The AlCl₃ product is obtained in practically quantitative yield in pure condition and with a uniform particle size.

The anhydrous AlCl₃ falls continuously into collector or collectors 12 hermetically connected with the condensing chamber and can be packed directly without any exposure to the atmosphere.

The process of the invention is initiated by preheating the aluminum charge to any temperature higher than the sublimation temperature of anhydrous AlCl₃. However a low temperature which is near to this minimum limit has to be used, in order to maintain the aluminum bed in solid condition and to assure high purity of the resulting AlCl₃ vapor. Ignition of the reaction can be brought about by any convenient device for heating one or more limited local zones of the solid aluminum charge, through which all or part of the chlorine gas reactant is passed. Electric heating means for initiating reaction between Al and Cl₂ are diagrammatically indicated at 14 in the drawing. Once the reaction has been initiated at the selected points, the reaction will proceed in orderly manner with total utilization of the chlorine and a regular and constant consumption of the aluminum charge takes place. The aluminum consumed by the reaction is periodically replaced from hopper 5.

In carrying out the process of the invention, the aluminum 15 to be reacted has to be maintained in solid condition. The heat evolved and the temperature in the reaction chamber 1 depend on the dimensions of the reaction chamber and the amount of reactants reacted therein per time unit, the velocity of the gaseous reagent and the thickness and material of the walls and bottom of the reaction chamber. The desired temperature can be maintained by the action of conventional cooling means 8 and 9 indicated in the drawing.

The invention includes the use of automatic regulating means in order to maintain the aluminum reactant in solid condition. If the reaction in the reaction chamber reaches the fusion temperature of aluminum so that some of the aluminum is melted, the molten metal will fall through grid 2 to the bottom 4 of the reaction chamber, and will there react with fresh chlorine discharged through openings 3a of tube 3. The consequence is that the supply of chlorine to the aluminum placed on grid 2 is prevented or considerably reduced, and the temperature on the grid will be reduced and fusing of aluminum discontinued.

The following examples illustrate some specific embodiments of and best modes for carrying out the invention, to which the invention is not limited.

*Example 1*

A vertical chamber lined with heat resistant material is charged with 100 kg. of granulated aluminum, the granules having an average diameter of 3–5 cm. Said granulated aluminum is supported by a base plate which is provided with perforations and arranged about 15 cm. above the bottom of the reaction chamber. The aluminum to be reacted is preheated by hot gases to about 200° C.

The chlorine gas is introduced into the reaction chamber e.g. through a quartz tube, which is packed with aluminum wire and is intensely heated at a point of the tube, which is outside the furnace for initiation of the reaction. The chlorine gas is discharged from said tube in the direction of the bottom of the reaction chamber and ascends from there to the metallic aluminum placed on the plate 2. The reaction starts at the preheated initiation point of the aluminum and extends from there to the entire charge of aluminum. Thereby aluminum chloride is formed, which ascends in vapor-form from the metallic aluminum bed at 200°–300° C. and is freed from non-vaporized impurities during said ascent. The AlCl₃ vapors leave the furnace through a channel which is arranged in the upper part of the furnace and is packed with packing bodies of aluminum. The dimensions of said channel and the amount of packing bodies are selected in such manner that the channel section allowing free passing of vapors corresponds to about 1 cm.² for every 150 g./hour of aluminum chloride to be passed through the channel.

Said channel opens into a voluminous and relatively cold condensing chamber whereby the outlet end of the channel reaches a distance of about 5 cm. from the inner surface of the vertical wall of the condensing chamber. The AlCl₃ vapors emerge in gaseous condition from the channel and pass in horizontal direction from the outlet of the channel with such velocity that sublimation and/or crystallization occur at such distance from the walls that no contact of the sublimed AlCl₃ with the walls occurs, i.e. that the sublimation zone is distant from the walls of the condensing chamber. Upon cooling the aluminum chloride vapors, first a floating fog is formed in the central hollow space of the condensing chamber and this fog agglomerates to small crystals which fall by gravity and are directly packed in containers which are connected to the outlet end of the condensing chamber and can be interchanged without interrupting the continuous discharge of the AlCl₃.

After about ½–⅔ of the aluminum placed on the grid in the reaction chamber has been converted into AlCl₃, the converted aluminum metal is replaced by aluminum metal from a chamber or the like, which is arranged above the reaction chamber and in which the aluminum is preheated due to irradiation by the reaction heat evolved in the reaction chamber.

The walls and the bottom of the reaction chamber are provided with water-cooling in order to maintain the temperature in the reaction chamber at the desired level and the condensation chamber, which can be made of aluminum, is also provided with cooling means, e.g. by water.

The process is continuous in raw material feed as well as in the collection of sublimated product.

*Example 2*

A cylindrical furnace made from refractory material enclosed by an iron shell provided with cooling means is filled with aluminum slugs lying on a system of perforated plates. Means are provided for the introduction of chlorine to the aluminum to be reacted. Above the lid of the furnace a chamber filled with aluminum slugs to be used for replacing aluminum slugs converted into AlCl₃ in the furnace, is arranged. The bottom of the furnace has a concave interior surface and is removable in order to allow examination of the interior and removal of ashes and other impurities accumulating therein. The reaction in the furnace is initiated by heating the aluminum packing in the chlorine feed pipe in the manner described in the above Example 1, and keeping the rest of aluminum charge at about 200° C. by suitable heating means. The AlCl₃ vapors emerge from the upper part of the furnace through a short channel which passes to a condensation chamber arranged near the reaction furnace, so that the space left between the reaction and condensation chamber is just sufficient for arranging the isolating layers and the cooling means of furnace and condensing chamber independently from each other. The further details of the apparatus and its operation are similar to those described in the above Example 1.

It will be understood from the above that this invention is not limited to the materials, conditions, elements, designs and other details specifically described above and can be carried out with various modifications. For example, the distance between the support for the aluminum to be reacted and the bottom of the reaction chamber may differ from that stated in the above Example 1. Furthermore, the aluminum to be reacted may be used in pieces having a different form and size from those stated in the above Example 1, e.g. in the form of turnings or other waste. The chlorine gas introduced into the reaction chamber may be preheated, e.g. to 20° to 60° C. It is desirable to maintain the temperature in the reaction chamber at a relatively low level, a.g. 200 to 300° C., because at such low reaction temperature $AlCl_3$ of increased purity is obtained. In the condensing chamber the $AlCl_3$ is cooled to about 10° to 50° C. As to the ratio between the reactants, it will be appreciated that the reaction chamber should always contain unconverted metallic aluminum to be reacted with the chlorine gas. The packing bodies in tube 7 which are inert to $AlCl_3$ may be in the form of wire, wire cloth, turnings, foils and the like. In order to initiate the reaction between Al and Cl, the aluminum charge is heated at any selected point to the necessary ignition temperature, while the rest of the charge can be maintained at a lower temperature, e.g. 180 to 200° C. The vapors passing through tube 7 reach the outlet of the tube e.g. with a temperature of 200° C. and they are subsequently cooled in the condenser and thereby converted into a fine crystalline powder. When starting the process, the aluminum on the grid 2 may be preheated with hot air to 250°–300° C. In carrying out the invention the starting material is metallic aluminum, but it will be understood that products in which aluminum is present in combination with other materials which does not affect the process of the invention and the purity of $AlCl_3$, e.g. suitable alloys of aluminum, can also be used. These and other modifications can be made without departing from the scope of the invention as defined in the appended claims.

What is claimed is:

1. A continuous process for producing anhydrous aluminum chloride by reacting metallic aluminum and gaseous chlorine, comprising reacting in a reaction chamber having cooled walls and cooled bottom particulate solid material containing metallic aluminum placed on a support which is placed at a distance above the bottom of said chamber and is provided with perforations, with gaseous chlorine introduced below said support and directed downward against the bottom of the reaction chamber, and from below through said support to said material, at temperatures in the range of 200–400° C. and introducing $AlCl_3$ vapor formed by said reaction into the central zone of a cooled empty space which is separate from the reaction chamber but connected with it by a channel filled with aluminum in the form of slugs, strips and the like, said empty space receiving said $AlCl_3$ vapor and being limited by a cooled condensing chamber within which the $AlCl_3$ vapor is converted by cooling into crystals; allowing said crystals to fall by gravity into a container connected with said condensing chamber; substantial melting of the particulate solid material by excessive reaction heat in the reaction chamber being prevented by the falling of any molten material containing metallic aluminum formed in the reaction chamber to flow downward to the bottom of the reaction chamber and react with fresh chlorine feed and cooling the walls and the bottom of the reaction chamber by cooling means applied to the outer surfaces, in order to reduce the reaction temperature of the material on said support.

2. A process as claimed in claim 1, in which the particulate solid material consists of metallic aluminum only.

3. An apparatus for the continuous production of anhydrous aluminum chloride by the reaction of solid materials containing metallic aluminum and gaseous chlorine at moderate temperature, comprising in combination a reaction chamber having side walls, a top and a bottom; having in its interior a perforated plate for supporting the aluminum reactant, in spaced relation to said bottom; being provided with means for discharging chlorine gas into the space between said perforated plate and the bottom, toward the cooled bottom; means for feeding aluminum reactant to said reaction chamber; means for initiating the reaction between the aluminum reactant and chlorine and means for cooling the walls and bottom of the reaction chamber; a condensing chamber having side walls and a top wall; a discharge channel arranged in the upper portion of the reaction chamber, for discharging $AlCl_3$ vapor from the reaction chamber and for introducing it into the condensing chamber, said discharge channel being filled with aluminum in particulate form; said discharge channel extending into the interior of the condensing chamber in order to discharge the $AlCl_3$ vapor into an empty middle zone of the condensing chamber and avoid contact of $AlCl_3$ with walls of the condensing chamber.

4. An apparatus as claimed in claim 3, in which the bottom surface of the reaction chamber has a concave shape.

5. An apparatus as claimed in claim 4, in which the condensing chamber is provided with means for cooling its walls; and the discharge channel for discharging $AlCl_3$ vapor extends into the central zone of said chamber in order to avoid formation of lumps on the walls.

6. An apparatus as claimed in claim 3, in which the condensing chamber has an elongated shape and its bottom end is adapted to be hermetically connected with an exchangeable container for $AlCl_3$.

References Cited in the file of this patent
UNITED STATES PATENTS

| | | |
|---|---|---|
| 1,566,269 | Burgess | Dec. 22, 1925 |
| 2,705,186 | Hardy et al. | Mar. 29, 1955 |
| 2,768,070 | Brazaitis | Oct. 23, 1956 |
| 2,798,030 | Hettick et al. | July 2, 1957 |
| 2,843,455 | Pardee | July 15, 1958 |
| 2,855,273 | Evans et al. | Oct. 7, 1958 |
| 2,890,111 | Shelton | June 9, 1959 |

FOREIGN PATENTS

| | | |
|---|---|---|
| 547,005 | Great Britain | Aug. 10, 1942 |

OTHER REFERENCES

Ralston: Anhydrous Aluminum Chloride, Tech. Paper 321, Dept. of the Interior, Bureau of Mines, pages 6–11 (1923).